United States Patent
Rioux

(10) Patent No.: US 6,648,193 B2
(45) Date of Patent: Nov. 18, 2003

(54) MULTIPURPOSE STEERING WHEEL HOLDER

(76) Inventor: Yvan Rioux, 40 Pl. Adage, LaPrairie QC (CA), J5R 4K8

( * ) Notice: Subject to any disclaimer, the term of this patent is extended or adjusted under 35 U.S.C. 154(b) by 0 days.

(21) Appl. No.: 10/195,655

(22) Filed: Jul. 16, 2002

(65) Prior Publication Data

US 2003/0010797 A1 Jan. 16, 2003

Related U.S. Application Data

(60) Provisional application No. 60/305,341, filed on Jul. 16, 2001.

(51) Int. Cl.[7] ................................................. B60R 7/04
(52) U.S. Cl. .................... 224/276; 108/44; 211/118; 248/462
(58) Field of Search ........................... 224/276; 108/44, 108/118, 127, 134, 135; 361/683; 211/113, 115, 116, 118; 248/339, 462

(56) References Cited

U.S. PATENT DOCUMENTS

| 4,139,217 | A | * | 2/1979 | Jamison | 224/276 |
|---|---|---|---|---|---|
| 5,016,852 | A | | 5/1991 | Herendeen | 248/462 |
| 5,060,581 | A | | 10/1991 | Malinski | 108/44 |
| 5,177,665 | A | * | 1/1993 | Frank et al. | 361/683 |
| 5,193,777 | A | * | 3/1993 | Faulstich | 108/44 |
| 5,372,348 | A | | 12/1994 | Cheng | 248/462 |
| 5,385,283 | A | * | 1/1995 | Shioda | 224/276 |
| 5,542,314 | A | | 8/1996 | Sullivan | 224/276 |
| 5,558,026 | A | * | 9/1996 | Seibert | 224/276 |
| 5,662,047 | A | | 9/1997 | Metcalf | 108/44 |
| 6,279,800 | B1 | * | 8/2001 | Lee | 224/276 |
| 6,305,217 | B1 | * | 10/2001 | Mansfeld et al. | 224/276 |
| 6,412,425 | B1 | * | 7/2002 | Chen | 108/44 |

FOREIGN PATENT DOCUMENTS

| DE | | 3701593 A1 | * | 8/1988 | 224/276 |
|---|---|---|---|---|---|
| DE | | 4233889 A1 | * | 4/1994 | 224/276 |

* cited by examiner

Primary Examiner—Gary E. Elkins

(57) ABSTRACT

A steering wheel book holder designed to be releasably attachable to a steering wheel without requiring special tooling or manual dexterity and designed so as to be customized to a various configuration and size of steering wheels and so as to provide a sturdy and reliable support surface for supporting printed matter and allowing the latter to be ergonomically readable to an individual seating behind the wheel of a conventional vehicle.

4 Claims, 4 Drawing Sheets

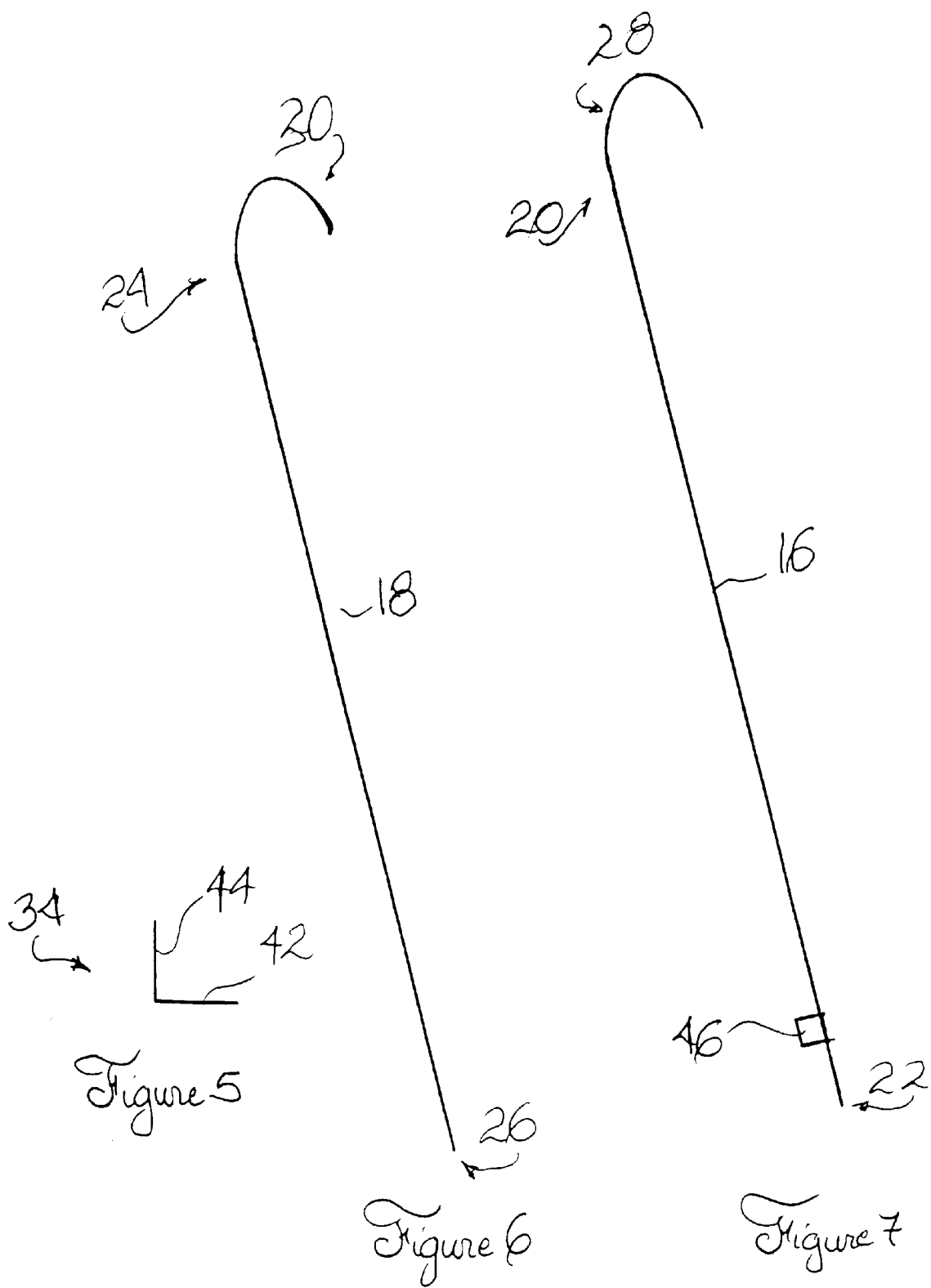

MULTIPURPOSE STEERING WHEEL HOLDER

This application claims benefit of prov. No. 60/305,341 filed Jul. 16, 2001.

FIELD OF THE INVENTION

The present invention relates to the general field of vehicle accessories and is particularly concerned with a multipurpose steering wheel holder.

BACKGROUND OF THE INVENTION

Vehicles such as automobiles, trucks and the like are used extensively for commuting purposes. However, some individuals regularly make use of their vehicles for activities other than commuting from place to place. Indeed, individuals, for vocational or leisure purposes increasingly tend to use the vehicle's privacy and comfort for leisure activities such as reading or for business work such as writing or reading a business related matter or use of a lap computer.

Portable utility consoles has been proposed for use in automobiles and trucks. Such console units are typically designed for placement either on the floor or seat of a vehicle and come in a variety of different sizes and shapes, depending upon the nature and size of the items to be sprawled. Some utility consoles are mounted on a transmission hump. Other seat mounted utility consoles are adapted for use by business travellers to accommodate briefcases, maps and the like. Small utility consoles are adapted to ride of the floor mat or on the seat, while larger console unites of the type providing a desk surface, usually include an attached tie-down strap to avoid shifting and/or spillage of the content.

Such utility are heavy, bulky and are difficult to store when not in use.

Conventional consoles which are secured by a tie-down strap are difficult to install and remove. Moreover, some utility consoles are customized for use in combination with a specific automobile type, and have contoured mounting surfaces which cannot be used with the seats of other vehicles.

The prior art is also replete with many concepts of trays and bracket assembly which are adapted to be secured under the dash on the floor of the vehicle. It has now found its advantage to provide any accessories adapted to be mounted under the dash since in many vehicles, the space is already occupied or retained by articles such as a radio, cassette player or the like. The assemblies have been proposed for installation on the floor of a vehicle only remain on the floor and constitute an encumbrance even if pivotable to stowed position.

The prior art has also recognized that the steering wheel of the vehicle constitute an interesting structure on which holders of various sorts can be mounted. Indeed, the prior art discloses a number of patents claiming support structures most typically suited for supporting objects such as lap top computer or even food. The prior art however lacks a suitable structure specifically designed to be used for supporting printed matter such as books, magazines, sheet or the like.

Stands for supporting printed matter in other context are old in the art. For example, music stands, lecterns and typing stands of various sorts are often designed to be rested on the ground surface or over a supporting table of the like. The prior art book holders suffer from numerous drawbacks and are not particularly well suited for use in the context of the cabin of a vehicle. Some of the drawbacks associated with prior art book holders include that they typically constitute relatively flimsy structures made out of foldable wire or sheet stuck frames that are best suited for supporting relatively small books. Also, although the structures are typically somewhat flimsy, they nevertheless require relatively large storage space when not in use. This proves to be a major drawback in the context of the vehicle cabin in which space is usually optimized.

The prior art book holders also lack a means for allowing the latter to be properly anchored to a supporting structure within a vehicle's cabin such as the conventional steering wheel of a conventional vehicle. The proposed multipurpose steering wheel holderis designed so as to be releasably attachable to a steering wheel without requiring special tooling or manual dexterity. Also, the proposed multipurpose steering wheel holderis adapted to be releasably attached to the steering wheel of a vehicle without damaging or otherwise altering the latter.

Still further, the proposed multipurpose steering wheel holderis designed so as to be readily hookable and removable from the steering wheel through a set of quick, easy and ergonomic steps. The proposed multipurpose steering wheel holderis also designed so as to be customized to a various configuration and size of steering wheels and so as to accommodate books or other printed matter of various sizes. The proposed multipurpose steering wheel holderis adapted to provide a sturdy and reliable support surface for supporting printed matter and allowing the latter to be ergonomically readable to an individual seating behind the wheel of a conventional vehicle.

The proposed multipurpose steering wheel holderis specifically designed so as to be easily configured between an expanded operational configuration wherein it is adapted to support printed matter and a folded retracted configuration wherein it occupies minimal storage space. In its folded configuration, the proposed multipurpose steering wheel holderessentially defines a generally elongated configuration that can easily be stored even in the confined and optimized interior space of most vehicle cabins.

Still further, the proposed multipurpose steering wheel holderis specifically designed so as to be manufacturable using conventional material in a conventional forms of manufacturing so as to provide a multipurpose steering wheel holderthat will be economically feasible, long lasting and relatively trouble free in operation.

BRIEF DESCRIPTION OF THE DRAWINGS

An embodiment of the present invention will now be disclosed, by way of example, in reference to the following drawing in which:

FIG. 5 In a transversals cross elevational view, illustrates a supporting rail, part of the multipurpose steering wheel holdershown in FIGS. 1 and 2.

FIG. 6 In a side elevational view, illustrates an auxiliary attachment arm, part of the multipurpose steering wheel holdershown in FIGS. 1 and 2.

FIG. 7 In a side elevational view, illustrates a main attachment arm, part of the multipurpose steering wheel holdershown in FIGS. 1 and 2.

DETAILED DESCRIPTION

Figure 1:
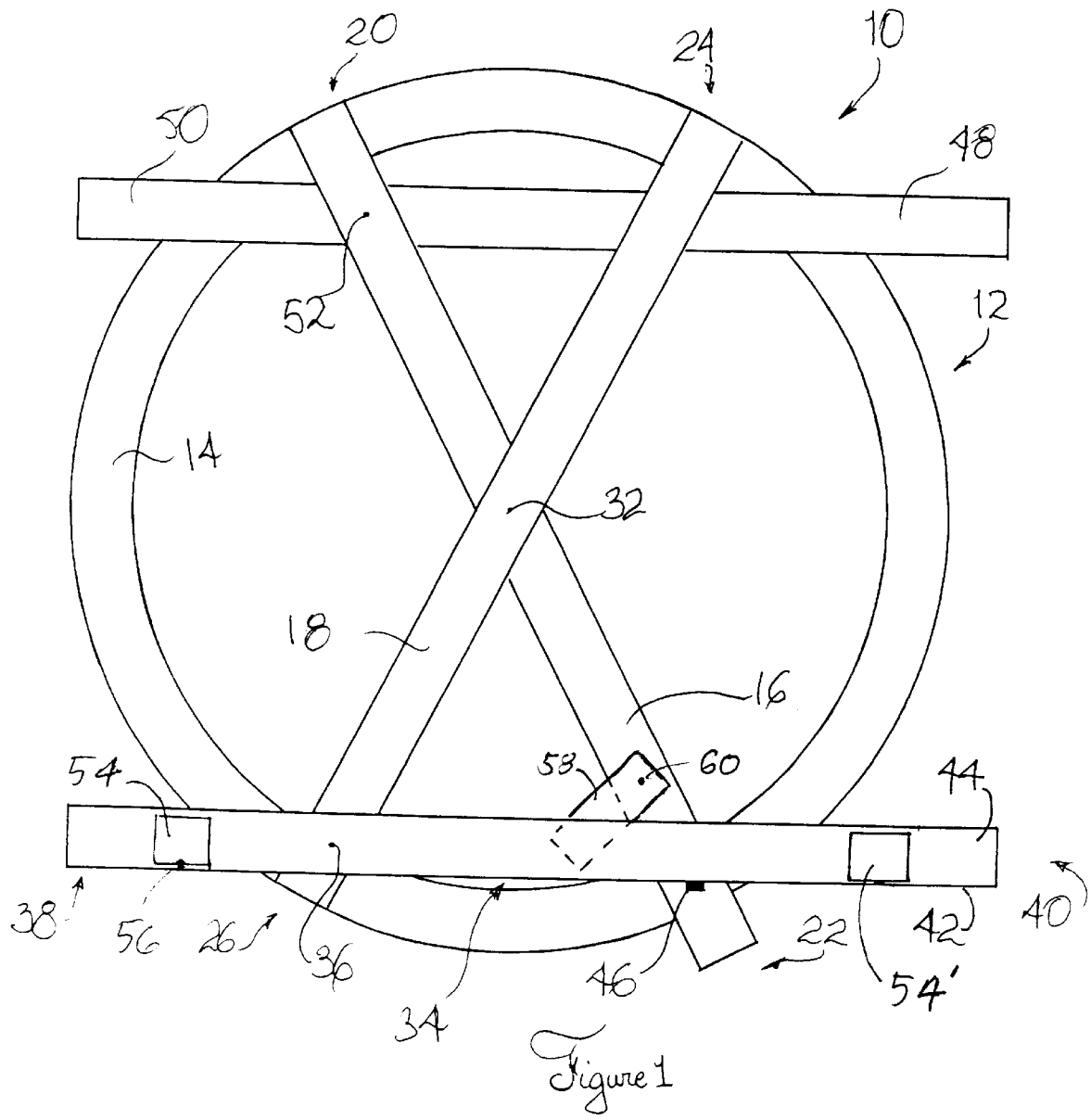
FIG. 1 In a front elevational view, illustrates a multipurpose steering wheel holderin accordance with an embodiments of the present invention in its extended configuration and mounted on a conventional steering wheel.

Referring to FIG. 1, there is shown a multipurpose steering wheel holder (10) in accordance with an embodiment of the present invention. The multipurpose steering wheel holder (10) is shown mounted over a conventional steering wheel (12), (only a portion of which is shown). The steering wheel (12) includes a generally toroidal ring (14) adapted to be grasped by the hands in the intended user for steering the vehicle, as is well known in art.

The multipurpose steering wheel holder (10) includes a main and an auxiliary attachment arm (16), (18) each having generally flat and elongated configurations.

The main attachment arm (16) defines a main attachment arm first longitudinal end (20) and an opposed main attachment arm second longitudinal end (22). Similarly, the auxiliary attachment arm (18) defines an auxiliary attachment arm first longitudinal end (24) and an auxiliary attachment arm second longitudinal end (26). Both the main and auxiliary attachment arm first longitudinal ends (20), (24) are provided with generally hook-shaped anchoring sections (28), (30) extending integrally therefrom. The hooking sections (28), (30) are configured and sized so as to be hookable over corresponding sections of the steering wheel ring (14).

The main and auxiliary attachment arm (16), (18) are pivotally attached together by an attachment arm pivotal link (32) positioned intermediate their respective longitudinal ends. The attachment arm pivotal link (32) allows the attachment arms (16), (18) to pivot relative to one another between the expanded configuration shown in FIG. 1 and the retracted folded configuration shown in FIGS. 2, 8 and 9.

A supporting rail (34) is pivotally attached to the auxiliary attachment arm (18) adjacent the auxiliary attachment arm second longitudinal end (26) by a supporting rail-to-auxiliary attachment arm pivotal link (36). The supporting rail (34) typically has a generally elongated configuration defining a supporting rail first longitudinal end (38) and a supporting rail second longitudinal end (40). Typically, the supporting rail-to-auxiliary attachment arm pivotal link (36) is positioned substantially adjacent the supporting rail first longitudinal end (38). As illustrated in FIG. 5, the supporting rail (34) has a generally L-shaped cross sectional configuration defining a rail end abutment plate (42) and rail cover supporting plate (44). The rail end and cover supporting plates (42), (44) typically extend in a generally orthogonal configuration relative to one another although the angle between both plates (42), (44) could vary without departing from the scope of the present invention. Optionally, the rail end abutment plate (42) can be further comprised of two pivotable "L" shaped retainers (54, 54') which are used for securing a laptop computer. Each of the pivotable "L" shaped retainer (54, 54') pivots around a pivot (56) which can pivot the generally vertical part of the "L" of the "L" shaped retainers (54, 54') and have it either adjacent to the rail cover supporting plate (44) as is the case of "L" shaped retainers (54) where the pivot (56) is visible or, alternatively, have it turned away as per (54'), where a laptop can be retained by the generally vertical part of the "L" of the "L" shaped retainer (54'). In FIG. 1, the pivot (56) of (54') is not visible since the vertical part of the "L" is hiding it. Furthermore, a tongue (58) pivotable around a tongue pivot (60) can be rotated so as to provide additional support to the cover supporting plate (44) when a laptop computer is being used.

A locking protrusion (46) protrudes outwardly from the main attachment arm (16) adjacent the main attachment arm second longitudinal end (22). The locking protrusion (46) is configured, sized and positioned so as to abuttingly contact the end supporting plate (42) part of the supporting rail (34) when the latter is in its extended configuration, shown in FIG. 1.

Figures 2, 3, 4:
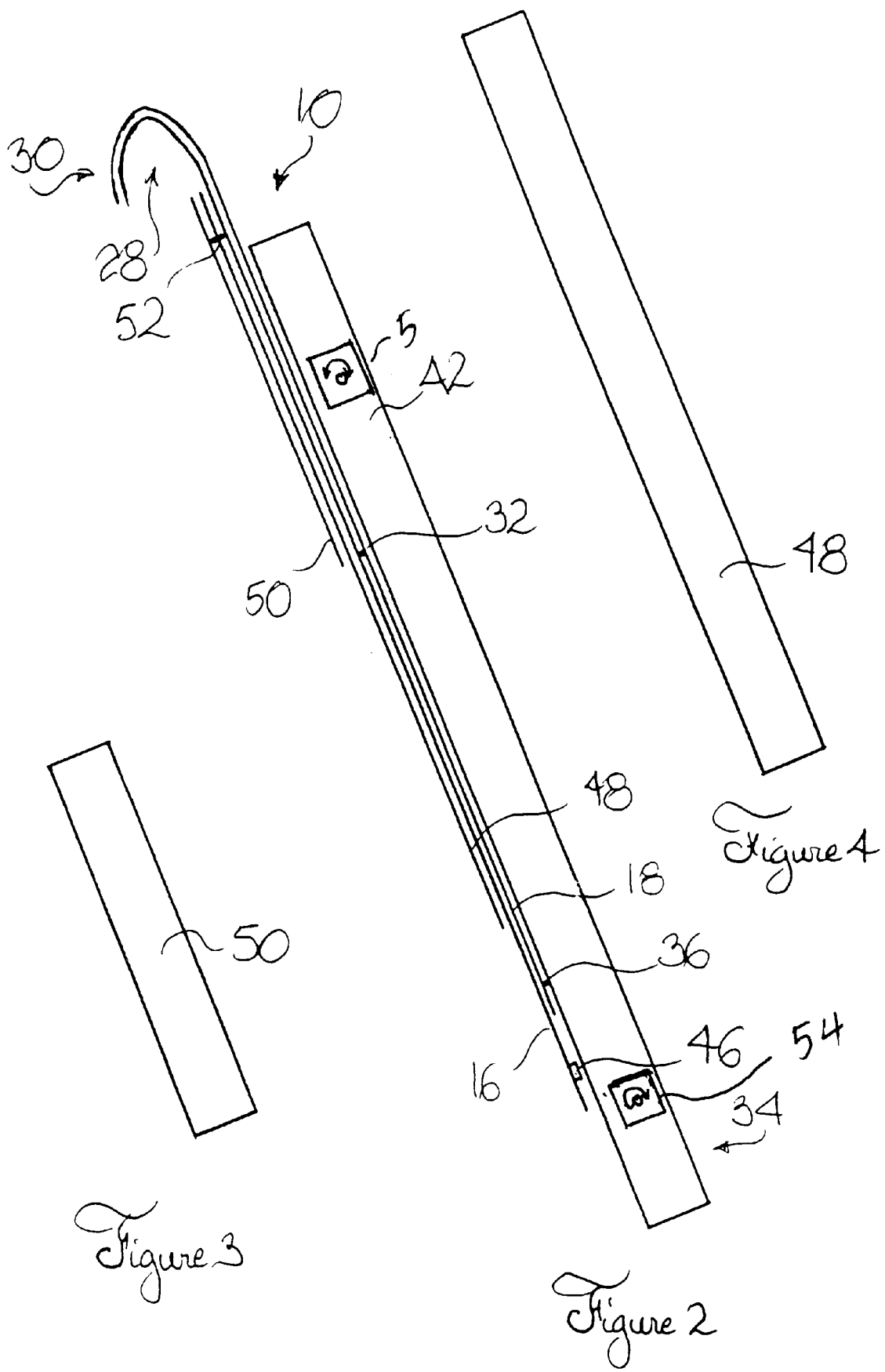
FIG. 2 In a side elevational view, illustrates the multipurpose steering wheel holdershown in FIG. 1 in its folded retracted configuration.
FIG. 3 In a front elevational view, illustrates an auxiliary abutment arm, part of the multipurpose steering wheel holdershown in FIGS. 1 and 2.
FIG. 4 In a front elevational view, illustrates a main abutment arm, part of the multipurpose steering wheel holdershown in FIGS. 1 and 2.
Figure 8:
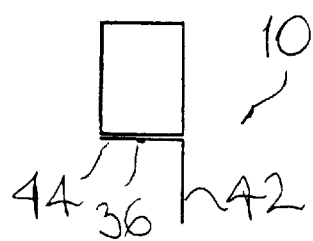
FIG. 8 In a top view, illustrates the multipurpose steering wheel holderin its retracted folded configuration.
Figure 9:
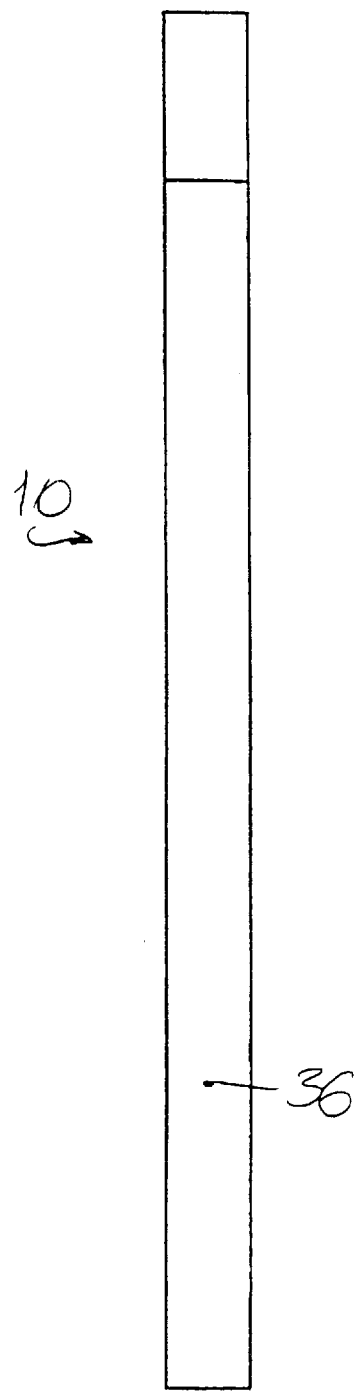
FIG. 9 In a front elevational view, illustrated the multipurpose steering wheel holderin its retracted folded configuration.

The multipurpose steering wheel holder (10) also includes a main and an auxiliary abutment arms (48), (50) both pivotally attached to the main attachment arm (16) adjacent the main attachment arm first longitudinal end by an abutment arm-to-attachment arm pivotal link (52). The main and auxiliary abutment arms (48), (50) are configured, sized and positioned so as to extend substantially collinearly with one another when the multipurpose steering wheel holderis in its expanded configuration, shown in FIG. 1.

in use, the main and auxiliary attachment arms (16), (10), the main and auxiliary abutment arms (48), (50) and the supporting rail (34) are adapted to be pivoted between their expanded configuration shown in FIG. 1 and their retracted folded configuration shown in FIGS. 2, 8 and 9. In the expanded configuration shown in FIG. 1, the main and auxiliary attachment arms (16), (18) are pivoted so that their respective hooking sections (28), (30) are anchored over the upper segment of a conventional steering wheel ring (14). The distance between the hooking sections (28), (30) may be adjusted depending on the type and size of the steering wheel ring (14). In the expanded configuration, the main and auxiliary abutment arms (48), (50) are in a generally collinear configuration opposite to one another and are adapted to abuttingly contact the exterior surface of the steering wheel ring (14) to stabilize the multipurpose steering wheel holder (10) in its expanded configuration when the latter is mounted over the steering wheel (12). Also, in the expanded configuration, the supporting rail (34) is abuttingly supported by the locking protrusion (46) in a generally horizontal configuration allowing a conventional book or other printed matter to be supported thereon. The main and auxiliary abutment arms (48), (50) thus also serve as an abutment means for supporting the book cover or cover of other printed material as is well known in the art.

As shown in FIG. 2, in the folded configuration, the supporting rail (34) is pivoted to a position substantially parallel to the auxiliary attachment arm (18). The auxiliary attachment arm (18) is, in turn, pivoted to a position substantially parallel with the main attachment arm (16). The main and auxiliary abutment arms (48), (50) are also pivoted to generally parallel relationship relative to the other components. The multipurpose steering wheel holder (10) in is retracted folded configuration thus forms a generally compact and substantially rectilinear volume that can be easily stored underneath the seat, in the glove cabinet or other suitable location within a conventional vehicle cabin.

The embodiments of the invention in which an exclusive privilege or property is claimed are defined as follows:

1. A multipurpose steering wheel holder comprising:

a main and an auxiliary attachment arm each having generally flat and elongated configurations;

said main attachment arm defining a main attachment arm first longitudinal and an opposed main attachment arm second longitudinal end; said auxiliary attachment arm defining an auxiliary attachment arm first longitudinal end and an auxiliary attachment arm second longitudinal end;

both said main and auxiliary attachment arms first longitudinal ends being provided with generally hook-shaped anchoring sections extending integrally therefrom; said hooking sections being configured and sized so as to be hookable over corresponding sections of said steering wheel ring said main and auxiliary attachment arms being pivotally attached together by an attachment arm pivotal link positioned intermediate their respective longitudinal ends;

said attachment arm pivotal link allowing said attachment arms to pivot relative to one another between an expanded configuration and a retracted folded configuration;

a supporting rail pivotally attached to said auxiliary attachment arm adjacent said auxiliary attachment arm second longitudinal end by a supporting rail-to-auxiliary attachment arm pivotal link; said supporting rail having a generally elongated configuration defining a supporting rail first longitudinal end and a supporting rail second longitudinal end; said supporting rail-to-auxiliary attachment arm pivotal link being positioned substantially adjacent said supporting rail first longitudinal end;

a locking protrusion protruding outwardly from said main attachment arm adjacent said main attachment arm second longitudinal end; said locking protrusion being configured, sized and positioned so as to abuttingly contact an end supporting plate part of said supporting rail when the latter is in its extended configuration;

a main and an auxiliary abutment arm both pivotally attached to said main attachment arm adjacent said main attachment arm first longitudinal end by an abutment arm-to-attachment arm pivotal link; said main and auxiliary abutment arms being configured, sized and positioned so as to extend substantially collinearly with one another when said multipurpose steering wheel holderis its expanded configuration.

2. A multipurpose steering wheel holder as recited in claim 1 wherein said supporting rail has a generally L-shaped cross sectional configuration defining a rail end abutment plate and rail cover supporting plate; said rail end and cover supporting plate extending in a generally orthogonal configuration relative to one another.

3. A multipurpose steering wheel holder as recited in claim 1 wherein the rail end abutment plate has a pair of pivotable "L" shaped retainers which pivot around a pivot.

4. A multipurpose steering wheel holder as recited in claim 1 wherein the main attachment arm is further comprised of a supporting tongue which pivots around a tongue pivot for supporting the rail cover supporting plate.

* * * * *